(12) United States Patent
Theriault et al.

(10) Patent No.: US 9,862,039 B2
(45) Date of Patent: Jan. 9, 2018

(54) MILLING TOOL WITH ROTATABLE CUTTING DISKS

(71) Applicants: Richard Theriault, San Diego, CA (US); Inhwan Chang, San Diego, CA (US)

(72) Inventors: Richard Theriault, San Diego, CA (US); Inhwan Chang, San Diego, CA (US)

( * ) Notice: Subject to any disclaimer, the term of this patent is extended or adjusted under 35 U.S.C. 154(b) by 197 days.

(21) Appl. No.: 14/836,003

(22) Filed: Aug. 26, 2015

(65) Prior Publication Data
US 2016/0059326 A1   Mar. 3, 2016

Related U.S. Application Data

(60) Provisional application No. 62/043,231, filed on Aug. 28, 2014.

(51) Int. Cl.
*B23C 5/08* (2006.01)
*B23C 5/22* (2006.01)
*B23C 5/20* (2006.01)

(52) U.S. Cl.
CPC ............. *B23C 5/2256* (2013.01); *B23C 5/08* (2013.01); *B23C 5/22* (2013.01); *B23C 5/207* (2013.01);
(Continued)

(58) Field of Classification Search
CPC ......... B23C 5/20; B23C 5/109; B23C 5/1072; B23C 5/2472; B23C 2200/361; B23C 2200/362; B23C 2200/363; B23C 2200/045; B23C 2200/0427; B23C 2200/0438; B23C 2200/0461; B23C 2200/0483; B23C 5/2256; B23C 5/08; B23B 2200/0414; B23B 2200/0433; B23B 2200/0442; B23B 2200/0452;
(Continued)

(56) References Cited

U.S. PATENT DOCUMENTS 1,790,613 A  *  1/1931  Gildersleeve et al. . E21B 10/12
                                                                    175/348
1,812,475 A  *  6/1931  Gildersleeve ........... E21B 10/12
                                                                    175/347
(Continued)

OTHER PUBLICATIONS

Satisloh, Consumables & Tools Catalog, Aug. 28, 2014.

*Primary Examiner* — Will Fridie, Jr.
(74) *Attorney, Agent, or Firm* — Gary L. Eastman, Esq.; Eastman & McCartney LLP

(57) ABSTRACT

A milling tool having multiple cutting disks is disclosed. Each cutting disk is anchored into a flute on the milling tool with clamping screws. During use, the cutting disks naturally become dull. In a preferred embodiment, a single clamping screw is used to hold the cutting disk in place. The clamping screw is loosened and the cutting disk is rotated such that a new and sharp portion of the cutting disk is exposed for use. In an alternative embodiment, multiple clamping screws are used to secure the cutting disk into the flute. In the event a cutting disk becomes stuck in a flute, a clamping screw in a threaded bore coaxially aligned with the locating bore is used to push the cutting disk and eject it out of the flute. This design allows for many positions on the cutting disk to be used before the disk needs to be replaced, sharpened, or refurbished.

18 Claims, 8 Drawing Sheets

(52) U.S. Cl.
CPC .. *B23C 2200/045* (2013.01); *B23C 2200/161* (2013.01); *B23C 2226/315* (2013.01); *B23C 2240/08* (2013.01)

(58) Field of Classification Search
CPC .... B23B 2200/0461; B23B 2200/0476; B23B 2200/0495; B23B 2205/045; B23B 2205/04; B23B 2205/08
See application file for complete search history.

(56) References Cited

U.S. PATENT DOCUMENTS

| | | | | |
|---|---|---|---|---|
| 5,975,811 | A * | 11/1999 | Briese | B23C 5/22 407/40 |
| 8,511,946 | B2 * | 8/2013 | Woodruff | B23B 29/03 408/224 |
| 2003/0059262 | A1 * | 3/2003 | Men | B23C 5/2221 407/35 |
| 2007/0201959 | A1 * | 8/2007 | Priller | B23C 3/32 407/67 |
| 2009/0175695 | A1 * | 7/2009 | Endres | B23B 27/12 407/113 |
| 2009/0257834 | A1 * | 10/2009 | Lysobey | B23B 29/03 407/36 |
| 2011/0103905 | A1 * | 5/2011 | Morrison | B23C 5/2213 407/48 |
| 2012/0082521 | A1 * | 4/2012 | Burtscher | B23B 27/1662 407/103 |
| 2013/0129436 | A1 * | 5/2013 | Hoffer | B23C 5/2221 407/102 |
| 2013/0142579 | A1 * | 6/2013 | Saji | B23B 27/1622 407/77 |
| 2014/0212226 | A1 * | 7/2014 | Saji | B23C 5/06 407/33 |
| 2014/0219733 | A1 * | 8/2014 | Roman | B23C 5/06 407/40 |
| 2014/0294522 | A1 * | 10/2014 | Woodruff | B23C 5/2475 407/40 |
| 2014/0348600 | A1 * | 11/2014 | Matsubara | B23C 5/2221 407/64 |
| 2015/0151364 | A1 * | 6/2015 | Choi | B23B 27/1662 407/104 |
| 2016/0271707 | A1 * | 9/2016 | Lee | B23C 5/207 |
| 2017/0001248 | A1 * | 1/2017 | Ramesh | B23B 27/145 |
| 2017/0113287 | A1 * | 4/2017 | Shamoto | B23C 5/242 |

* cited by examiner

MILLING TOOL WITH ROTATABLE CUTTING DISKS

RELATED APPLICATIONS

This application claims the benefit of priority to United States Provisional Patent Application titled "Milling Tool with Rotatable Cutting Disks", Ser. No. 62/043,231, filed on Aug. 28, 2014.

FIELD OF THE INVENTION

The present invention relates to a cutting device for generating rough cut ophthalmic lenses. More specifically, the invention is a cutting tool having rotatable cutting disks located along the outside circumference of the cutting tool, which allows the cutting disks to be rotated such that a new and sharp section of the cutting disk comes in contact with the lens.

BACKGROUND

The early history of lenses is unknown. In 1845 an archeologist uncovered in what is now Iraq an ancient rock crystal ground to form a small convex lens, but there is no evidence that lenses were widely known or used in ancient times. An early investigation of the principles of lenses was made in the 11th century by Alhazen, a Persian physicist. Spectacles with convex lenses were in common use both in Europe and in China as early as the 13th century.

Zacharias Janssen, a Dutch optician, is credited with combining lenses to make a compound microscope about 1590. Galileo improved the telescope in 1609. The art of design and manufacture of lenses has progressed steadily since that time.

Ophthalmic Lenses are designed to refract light so that it reaches the retina. It is necessary for light rays to focus on each retina, in the back of our eyes, in order for us to see. When the eye's own optical system cannot refract light onto the retina, ophthalmic lenses are needed.

The main job of the ophthalmic lens is to manipulate light. Lenses are used for many reasons. The main reasons they are prescribed is for safety, vision, and comfort. Different materials are used for specific purposes and visual needs. Most ophthalmic lenses refract light rays to reach the retina, reflect uncomfortable or dangerous light rays, reflect annoying glare, absorb light for comfort or safety, and transmit light for better vision.

The most common reason lenses are prescribed is for vision. Three factors determine the prescription in a lens. They are the material (index of refraction), thickness, and curvature. In theory, lenses are considered as being prisms attached base-to-base or apex-to-apex. A convex lens (prisms base-to-base) magnifies images, and is used for the correction of Hyperopia or Presbyopia. A concave lens (apex-to-apex) minifies images, and is used for the correction of Myopia. Cylinder (toric) lenses are also used for the correction of astigmatism, and have different powers in different zones of the lens.

The design and production of lenses is a complex art and science. Glass and Plastic-type lenses, with the exception of polycarbonate, are made from a molding process. First, the lens designer calculates the best curvatures necessary for superior optical quality. Then, a computerized program attached to a digital file and lathe cuts the inside/top surface of the mold. This could be a single curvature for single vision lenses, or multiple curves for an aspheric lens or a progressive addition lens. Then, the back of the mold is typically attached and liquid plastic (monomers and polymers) are added. After the annealing and cooling process is complete, the lens is ready to be surfaced. Surfacing a lens means cutting curves into the back side to create the prescribed numbers, or spectacle prescription. In simple spherical curves, a steeper curve yields a stronger prescription and a flatter curve yield a weaker prescription. Once polished, the finished lens is ready to be edged for the shape of the frame. Many coatings and filters can be added to the lens to manipulate light in different ways, such as ultraviolet filters and scratch resistant coatings.

In milling the lens, typically a disk-like tool is used having a series of cutting edges located around the outer edge of the disk. These cutting edges can be made from a diamond or a diamond like substance and are typically brazed onto the disk. An example is Satisloh's 12 Blade fixed PCD insert milling wheel, model 92-009-346. However, to replace the cutting edges on this milling wheel, each cutting bit needs to be heated such that the brazing liquefies thereby allowing the cutting edge to be removed from the tool body. This process is both costly and time consuming.

Another drawback to using a disk with fixed cutting edges is the limited amount of the cutting edge that can be used before the cutting edges need to be sharpened or replaced when they can no longer be sharpened. Modern lens generators have a small footprint, which limits the amount the cutting tool may move relative to the lens. This limited amount of movement results in only a small portion of the cutting edge being used before the tool needs to be sharpened or replaced, which adds additional cost and time to the lens production process. To overcome this inefficiency in the production process, tools having quick replacement cutting edges have been developed. This design allows for the cutting edges to be rotated in place thereby moving a fresh and sharp section of the cutting edge to the point that contacts the lens. However, even these new designs have limitations. For instance, Satisloh's T66 Cutting Wheel with PCD inserts, model number 92-002-738, replaces typical fixed inserts with 8 replaceable inserts. This newer design provides an improvement over earlier designs, yet it still has drawbacks. For example, Satisloh's design only allows the cutting edges to be rotated to a clean cutting position up to three (3) times before the cutting edge must be removed and sharpened as suggested by the manufacturer. In addition, the cutting edges may only be sharpened up to 3 times, depending on the condition of the cutting edges, further limiting the cost and time advantages of this design.

Another example is Mapal's cutting wheel. This wheel also has several drawbacks. The cutting edge inserts are located off the center bore of the flute into which the cutting disk mounts. Variations in the bore of each flute results in inaccurate location of the cutting edges with regards to generating an effective and consistent radius during rotation. The cutting disks are secured with a screw and reverse clamp thread plate where the cutting disk is held in place with no more than three (3) threads on average, resulting in the cutting disk insert possibly becoming loose during operation. During use, the cutting disk insert may become stuck in the flute. Current cutting tools lack a release mechanism allowing for the safe release of a cutting disk in the event it becomes stuck. Due to the extreme sharp nature of the cutting edges, a user's hand or fingers could easily be cut while attempting to remove a stuck cutting disk insert from the flute. The clamp plates and center location bores are easily damaged during clamping and tool setting. Finally, clearance between flutes makes assembly and disassembly difficult and may result in injury to the user or damage to the cutting disk during insertion or removal of the cutting disk.

What is needed in the industry is a cutting wheel having replaceable cutting edges. A further benefit is a cutting wheel where the cutting edges are positionable to more than three (3) positions thereby extending the life of the tool as well as minimizing the costs associated with removal and replacement of the cutting tool as well as the costs associated with the sharpening of the edges themselves.

SUMMARY

The present invention consists of rotatable cutting tool. The cutting tool has replaceable cutting disks located around its outside. The cutting disks consist of circular disk having a cutting edge formed around the outermost edge of the disk. The cutting disks are secured into the cutting tool in a starting position. As the edges start to dull from cutting, the cutting edges are rotated such that a new and sharp portion of the cutting edge is available for forming a lens surface. After several rotations of the cutting edge such that no new and sharp portions are available, the cutting disks are safely removed and replaced. The alignments of the cutting edges are maintained through the use of an accurate location bore and two direction clamp design. Another one direction screw is for pushing the insert back easily releasing it and avoids wedging the bottom surface of insert into the locating bore. Inserts are easily set into place and removed without resistance caused by damaged components and locating bores. Preset torque is utilized for tool presetting, tool grinding, and tool inspection where the preset torque will not cause any structural or dimensional damage to the cutter body, locating bore, or insert clamp taper. The new design tool provides greater clamping force then earlier designs. Finally, ample clearance is provided between flutes for ease of assembly and replacement of cutting disks.

Another distinct advantage of using the milling tool of the present invention is the milling tool can be dynamically balanced to a higher degree on a Haimer dynamic balancer or similar machine. A balanced milling tool is necessary to ensure cuts made on lenses are predictable and repeatable with reduced vibration over the course of the milling tool's life, thereby reducing production time and costs. Since the present invention has a reduced part count compared to other milling tools with rotatable cutting disks, the milling tool may be balanced to G2.5 at 35,000 RPM. Further, the individual parts associated with the milling tool of the present invention are always located at the same position and orientation after maintenance, thereby making it easier to maintain the milling tool in balance during use. A balanced milling tool is necessary to ensure cuts made on lenses are predictable and repeatable over the course of a milling tools life, thereby reducing production time and costs. Further, the individual parts associated with the milling tool of the present invention are always located at the same position and orientation after maintenance, thereby making it easier to maintain the milling tool in balance during use.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1a shows a wheel with offset flutes and cutting edges along the face of each flute. FIG. 1b shows a milling wheel having symmetric flutes and cutting edges along the face of each flute;

DETAILED DESCRIPTION

The invention described herein provides an improvement in the milling industry where removable and replaceable cutting disks are inserted in to a flute located on a milling tool body where the cutting disks can be rotated to maximize the life of a cutting disk.

Figure 1A:
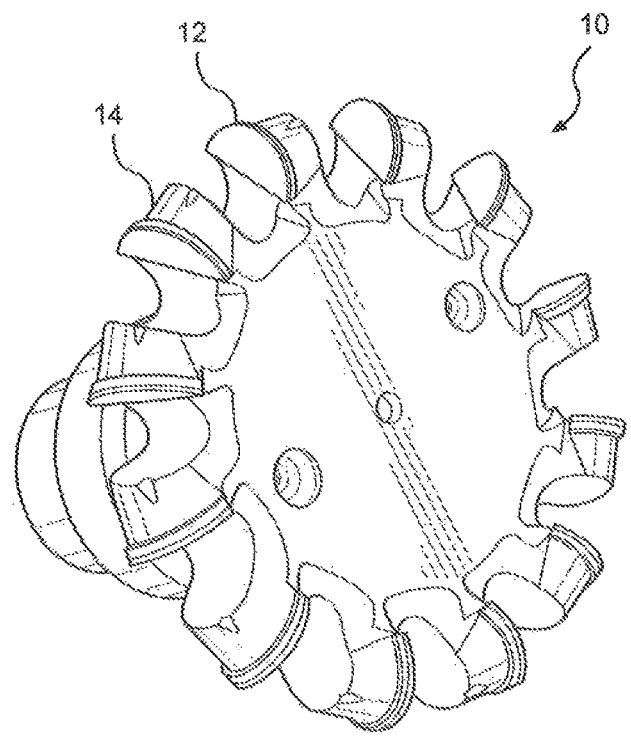
FIGS. 1a and 1b are perspective views of prior art milling wheels having fixed cutting edges.

Referring to FIG. 1a, a perspective view of a prior art milling wheel is shown and designated 10. Milling wheel 10 has twelve (12) offset flutes 14, each flute 14 having a fixed semi-circular cutting edge 12. In the use of milling wheel 10, only a small portion of cutting edge 12 will come in contact with the material being milled. As such, unless the angle between milling wheel 10 and the material being milled is adjusted to bring another sharp portion in contact with the material being milled, the life of cutting edge 12 will be determined by the life of only the one small portion that comes in contact with the material. Even if this design is angled with respect to the material being milled, the semi-circular nature of cutting edge 12 limits the number of available positions between cutting edge 12 and the material being milled.

Figure 1B:
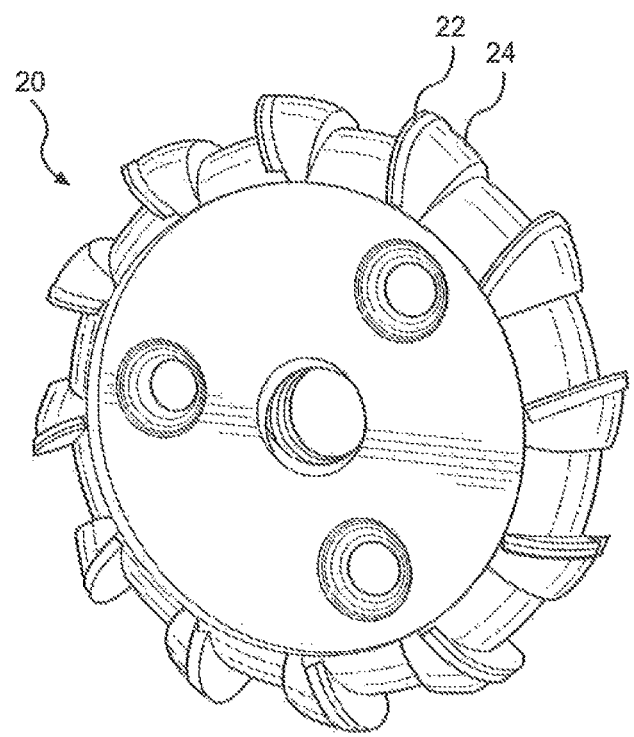

FIG. 1b is a perspective view of a prior art milling wheel and designated 20. Similar to the milling wheel shown in FIG. 1a, milling wheel 20 has twelve (12) flutes 24, each flute 24 having a cutting edge 22 adhered to its face. This milling wheel also suffers from the same drawbacks of milling wheel 10 shown in FIG. 1a. Only a small portion of cutting edge 22 comes in contact with the material being milled. If the angle between milling wheel 20 and the material being milled is not changed, then the life of milling wheel 20 will be determined by the life of only the small portion of cutting edge 22 that comes into contact with the material being milled. Also similar to milling wheel 10, the semi-circular nature of cutting edge 22 limits the number of available positions between cutting edge 22 and the material being milled.

Figure 2:
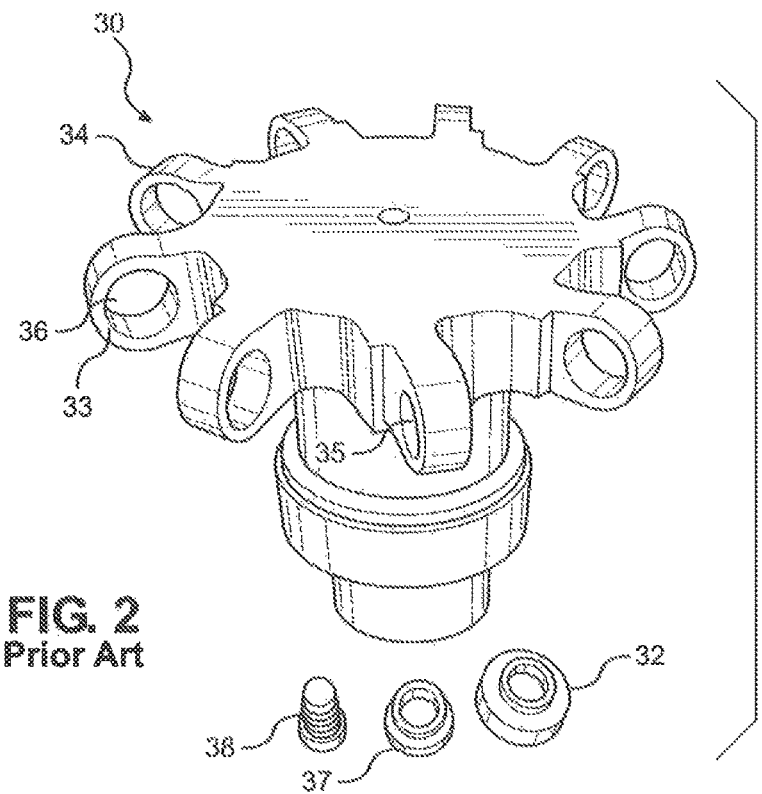
FIG. 2 is a perspective view of a prior art 9-station milling wheel from Mapal Inc. consisting of a tool body having 9 flutes and a cutting edge, alignment boss, and screw used for each flute.

FIG. 2 is a perspective view of another prior art milling wheel from Mapal Inc. and designated 30. Milling wheel 30 has nine (9) flutes 34, each flute 34 having a through-hole mounting bore. A cutting disk 32 is placed on the leading face 35 of flute 34. An insert boss 37 is positioned on the trailing face 33 of flute 34. Mounting screw 38 is then inserted through cutting disk 32 and threaded into insert boss 37. A drawback to this design is there are only a few threads available to secure mounting screw 38 into insert boss 37, leading to loosening of the assembly during use and subsequent misalignment of cutting disk 32. This misalignment also leads to cutting disk 32 becoming stuck in flute 34, requiring extra force and handling to release cutting disk 32 from flute 34. In addition to possible damage caused to cutting disk 32 during removal from flute 34, is the danger of seriously cutting, or in some other way harming, a person from the extremely sharps edges of cutting disk 32. Other disadvantages of this design are cutting disks 32 locate off of mounting bore 36. Mounting bore 36 does not have accurate location with regards to generating an effective radius during rotation. Insert boss 37 and mounting bore 36 can be easily damaged during removal if cutting disk 32 or insert boss 37 become stuck.

Figure 3:
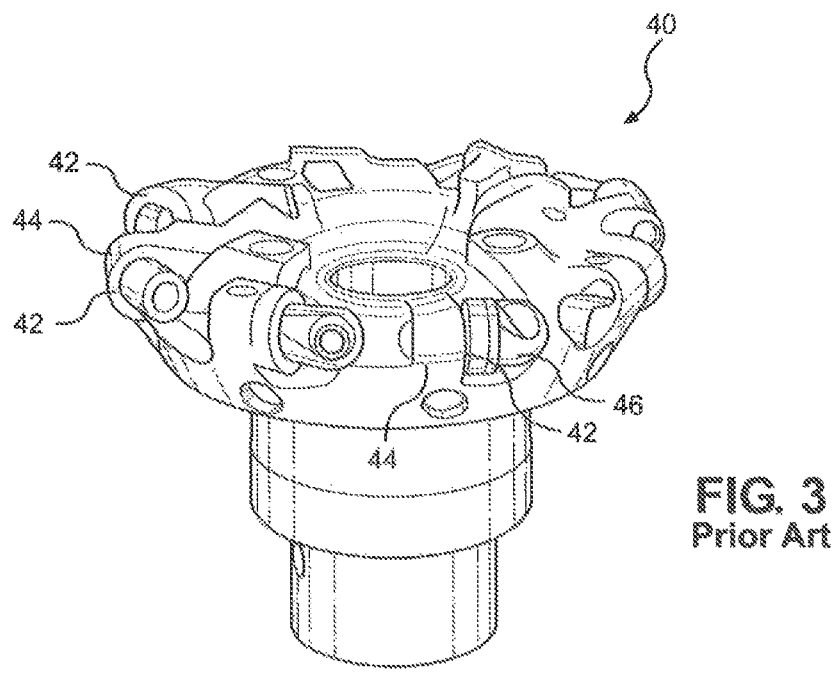
FIG. 3 is a perspective view of a prior art 8-station milling wheel from Satisloh AG consisting of a fully assembled tool body having a tool body, flutes, cutting edges, and a retention device for securing the cutting edge in place.

FIG. 3 is a perspective view of a prior art milling wheel from Satisloh Inc. and designated 40. Milling wheel 40 has eight (8) flutes 44, each flute 44 having a bore (not shown) for mounting a cutting disk 42. Each cutting disk 42 is secured in place using mounting hardware 46. Furthermore when cutting disk 42 is changed, all mounting hardware 46 must be removed. In this design, each cutting disk is rotatable only three (3) times before cutting disk 42 needs to be removed and serviced as suggested by the manufacturer. Further, each disk may only be sharpened three (3) times as suggested by the manufacturer. In addition, the indexable milling inserts are pressed onto a locating pin to establish position. The locating bore on the reverse side of the milling insert is made of tungsten carbide with a hardness of at least 85HRC. The locating pin is made of hardened steel with a hardness of much less than 85HRC. Due to the extreme difference in HRC hardness levels excessive wear is generated onto the locating pin during normal usage. As the pin continues to wear, a loss of location is noticed that creates a non-uniform rotational radius plus it prevents uniform cutting pressure from being applied to the surface of the lens. These limitations add to costs associated with maintenance and production. Lastly, the spacing between flutes 44 makes it difficult to install and remove cutting disk 42 and mounting hardware 46.

Figure 4:
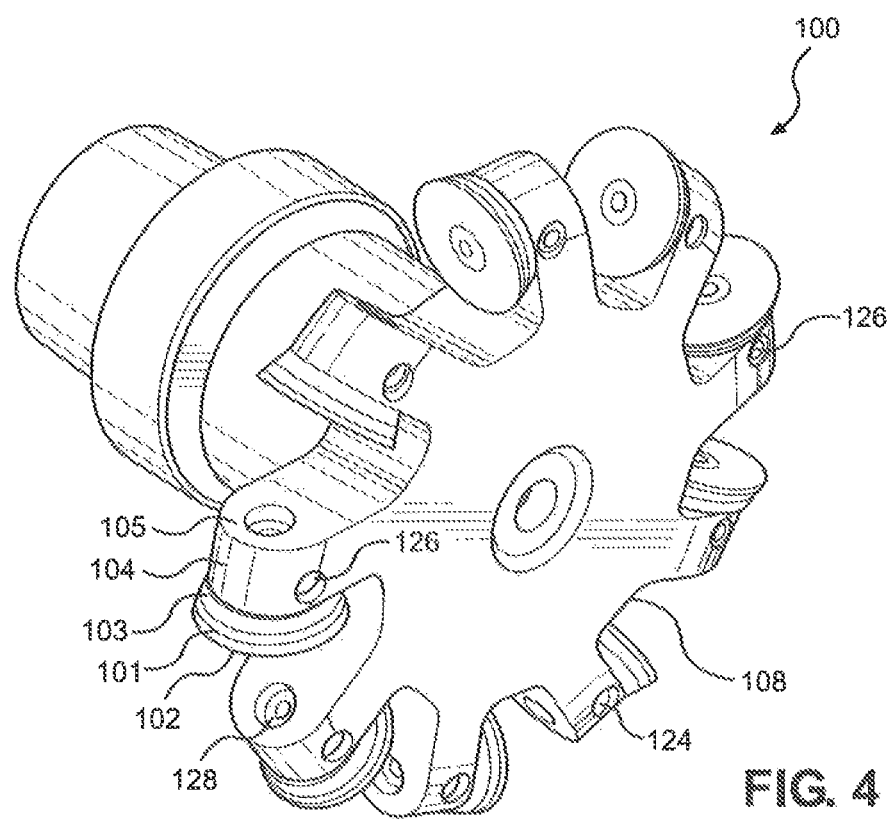
FIG. 4 is a perspective view of an embodiment of the present invention showing a milling wheel having 9 flutes, each flute having a circular cutting disk and a clamping screw.

FIG. 4 is a perspective view of a preferred embodiment of the milling tool of the present invention and designated 100. Milling tool 100 consists of nine (9) flutes 104 located around the outer circumference of tool body 108. Each flute 104 has a leading face 103 and a trailing face 105. Located at the center of leading face 103 is locating bore 128, which extends through flute 104 to trailing face 105. Cutting disk 101, having locating pin 110 (Not shown; see FIGS. 5a and 5b), is mounted into locating bore 128. Cutting disk 101 is held in place by clamping screw 124 inserted through threaded hole 126.

In a preferred embodiment of the present invention, tool body 108 is made from a high strength metal. However, in some cutting environments, chemicals and other agents used in the milling process may cause metals to corrode. As such, in certain alternative embodiments, stainless steel, such as, for example, 400 stainless steel, and molybdenum infused metals, is used for tool body 108. To provide additional corrosion resistance, some embodiments have tool body 108 coated with, for example, titanium nitride (TiN), titanium aluminum nitride (TiAlN), or diamond based coatings. Anti-corrosion coatings may be applied using chemical vapor deposition (CVD), physical vapor deposition (PVD), or as a nano coating. Other embodiments of milling tool 100 may be made using high strength composite materials, including polymers, having corrosion resistance properties suitable to withstand the effects of the chemicals and agents used in the milling process. In addition, clamping screw 124 may be made from titanium or other corrosion resistant material. Further, clamping screw 124 may be coated with a corrosion inhibiting material.

Figure 5A:
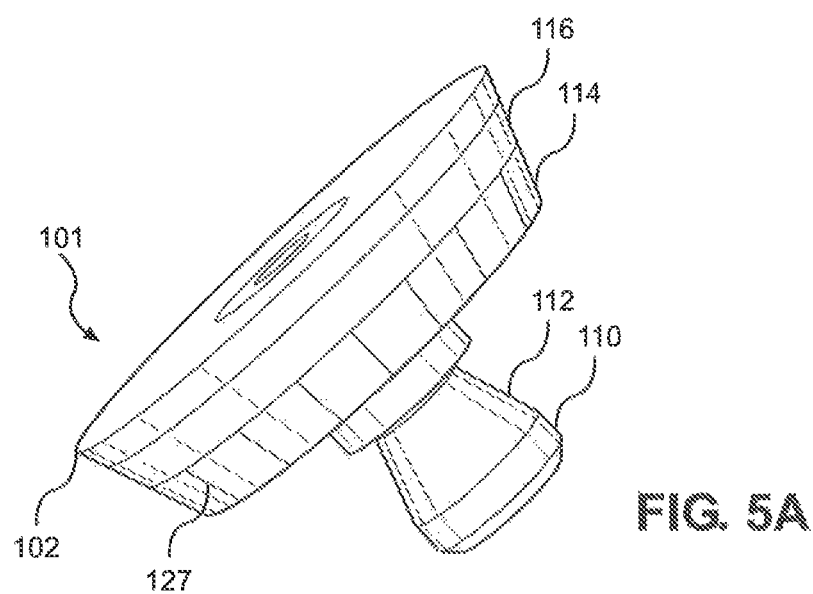
FIG. 5a is a side view of a cutting disk of the present invention having a cutting edge adhered to backing disk, a locating pin with clamping bevel, and circumference markings around the outside of the cutting disk base.

Referring now to FIG. 5a, a side view of cutting disk 101 is shown. Cutting disk 101 consists of cutting edge 102, which is mounted to cutting edge backing disk 116, which in turn is mounted to cutting disk base 114. Cutting edge 102 may be a poly crystalline diamond or a CVD diamond material and cutting edge backing disk 116 may be a carbide material. Typically, cutting edge 102 and cutting edge backing disk 116 are bonded to each other at the time of manufacture in the form of a sheet or blank. The combination of cutting edge 102 and cutting edge backing disk 116 are then cut and/or machined to the required dimensions for use in creating cutting disk 101. Extending from the side opposite cutting edge 102 is clamping pin 110. Clamping pin 110 has clamping bevel 112. When cutting disk 101 is inserted into locating bore 128, clamping bevel 112 is aligned with threaded hole 126. Clamping screw 124, when inserted through threaded hole 126, places force on clamping pin 110 such that the force prevents cutting disk 101 from rotating in or coming out of locating bore 128 during use. In operation, milling tool 100 rotates at a high rate, which creates a centrifugal force on the milling tool 100 and the individual components that make up milling tool 100, such as cutting disk 101 and clamping screw 124. The orientation of clamping bevel 112 helps to minimize the effects of the centrifugal forces created during rotation on the clamping screw, where the centrifugal forces may result in a minor shifting of cutting disk's 100 position in locating bore 128, since the bevel is at an angle from the centrifugal forces. Ensuring cutting disk 101 does not move during operation of milling tool 100 allows milling tool 100 to create the fine cuts needed to create a lens, which would be difficult to create if cutting disk 101 moved, even if only slightly, during operation. The angle of the clamping bevel also helps to ensure that clamping screw 124 does not become loose due to the centrifugal forces since clamping screw 124 and threaded hole 126 are at an angle to the direction of the centrifugal forces created during operation.

Around the outside edge of cutting disk base 114 are position markers 127. Position markers 127 are used to indicate the location of cutting disk 101 as it is rotated in locating bore 128. This prevents the used and dull portions of cutting edge 102 from being positioned such that the used and dull portions come in contact with the material being milled. It is to be appreciated by someone skilled in the art that position markers 127 may be located on other portions of cutting disk 101 without departing from the intent and spirit of the present invention. In an exemplary operation, new cutting disks 104 are inserted into the flutes 104 such that position '1' of position index 127 aligns with position marker 129. After a period of use when it is determined that the portion of cutting edge 102 used to mill material has dulled, Clamping screws 124 are loosened thereby allowing cutting disk 101 to rotate in locating bore 128. Cutting disk 101 is rotated to the next position of position index 127 and clamped in place using clamping screws 124. This process of rotating cutting disk 101 to the many position indexes 127 allows for extended use of cutting disks 101 before they must be removed from operation and either sharpened, rebuilt, or replaced. This extended use will reduce operation costs of milling tool 100 and production costs as a whole. This design is an improvement over prior art in that it provides more than three (3) positions for cutting disk 101 to be oriented.

When cutting a lens, specific arcs are used to create specific lens characteristics. The amount of arc needed to cut a lens determines the amount cutting disk 101 must be rotated to utilize an unused portion of cutting edge 102. For example, if a lens needs a nine (9) degree arc to create the desired cuts in the lens, and a one (1) degree arc is needed between portions to ensure clean and uniform cuts, a typical cutting disk 101 will have 10 distinct cutting portions usable during the lifetime of cutting disk 101. This increase in usable cutting portions greatly reduces manufacturing and maintenance costs as well as logistical costs associated with the operation of the mill. To put this into perspective, a mass lens production facility may mill up to 25,000 lenses per day. A typical milling operation for a lens may cost fifteen (15) cents resulting in a cost of $3750 per day or $1,368,750 per year. Using the milling tool of the present invention, the milling operation for a lens may cost three (3) cents per lens, resulting in a cost of $750 per day, or $273,750 per year, for a savings of $3,000 per day, or $1,095,000 per year.

During the manufacture of cutting disk 101, cutting edge backing disk 116 is typically brazed onto cutting disk base 114. Cutting disk base may be made from a carbide material, which may suffer from corrosion while in use. To minimize the effects of corrosion, cutting disk base may be made from stainless steel or titanium. However, especially with stainless steel, brazing cutting edge backing disk 116 onto cutting disk base 114 is difficult and typically requires high heat temperatures, which may cause the cutting disk base 114, cutting edge backing disk 116, and cutting edge 102 to become brittle. A brittle cutting edge 102 is difficult to sharpen since the sharpening process may cause small, if not microscopic, portions of cutting edge 102 to break off resulting in a non-uniform edge. In an alternative embodiment of the present invention, cutting edge backing disk and cutting disk base are adhered to each other using an industrial adhesive. The use of an industrial adhesive removes the need to apply high temperatures used during brazing that causes portions of cutting disk 101 to become brittle. It is to be appreciated by someone skilled in the art that any high strength bonding process may be used without departing from the scope of the invention.

Figure 5B:
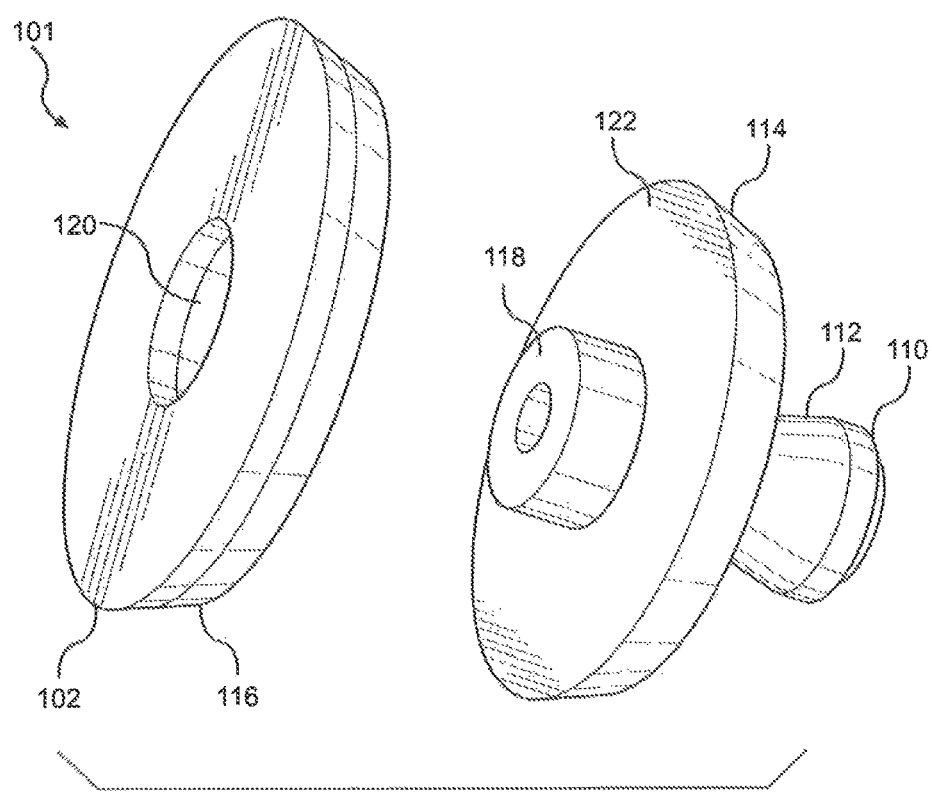
FIG. 5b is an exploded perspective view of a cutting disk of the present invention showing an alignment pin extending from the center of a cutting disk base and the corresponding hole in the cutting edge and backing disk.

FIG. 5b is an exploded view of cutting disk 101. Cutting edge 102 is shown mounted to cutting edge backing disk 116. In the center of cutting edge 102 and cutting edge backing disk is cutting edge alignment hole 120. Extending upward from cutting disk base seating surface 122 is cutting disk base alignment pin 118. During assembly, cutting disk base alignment pin 118 is inserted into cutting edge alignment hole 120, then cutting disk backing disk 116 is adhered to cutting disk base seating surface. The alignment of cutting edge alignment hole 120 and cutting disk base alignment pin 118 allows for proper positioning of cutting edge 102 in relation to cutting disk base during assembly. Further, cutting disk base alignment pin 118 works to minimize lateral forces on the adhesion of cutting edge backing disk 116 to cutting disk base 114.

In an alternative embodiment, cutting disk 101 may be constructed from one single piece of high strength material thereby eliminating the need to adhere individual pieces through brazing or the use of adhesives. In yet another alternative embodiment, cutting disk 101 minus the cutting edge 102 may be constructed from one piece where cutting edge 102 is a diamond-based material applied to the one piece cutting disk 101 through chemical vapor deposition, physical vapor deposition, or as a nano coating. After application of the cutting edge 102 to the one piece cutting disk, cutting edge 102 may be ground and/or polished to achieve the desired cutting characteristics.

Figure 6A:
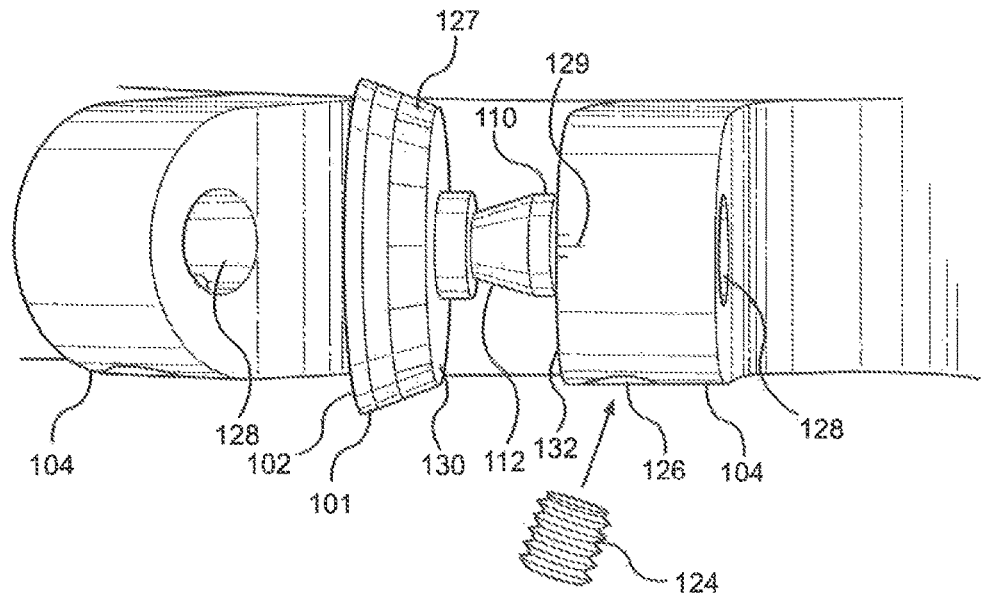
FIG. 6a is a top view of a cutting disk and clamping screw aligned for insertion into a flute.

FIG. 6a is a top view of cutting disk 101 and clamping screw 124 aligned for insertion into flute 104 through locating bore 128 and threaded hole 126 respectively. Cutting disk 101 is inserted into locating bore 128 until cutting disk seat 130 comes into contact with flute seating surface 132. Also shown is clamping bevel 112 on clamping pin 110. Proper alignment of Cutting disk 101 is maintained by clamping pin located within locating bore 128. Unlike the flutes shown in the prior art of FIG. 2, Flutes 104 maintain a substantial thickness between locating bore 128 and the edges of flute 104 resulting in greater stability and alignment of cutting disk 101 when clamped into flute 104. In a preferred embodiment, threaded hole 126 is not perpendicular to the face of tool body 108 but at an offset angle from the perpendicular of tool body 108. The offset angle causes threaded hole to point partially in the direction of the leading face 103 of the flute 104. When clamping screw 124 is inserted in threaded hole 126 to hold cutting disk 101 in place, the rotation of milling tool 100 causes a force to be applied to clamping screw 124

Figure 6B:
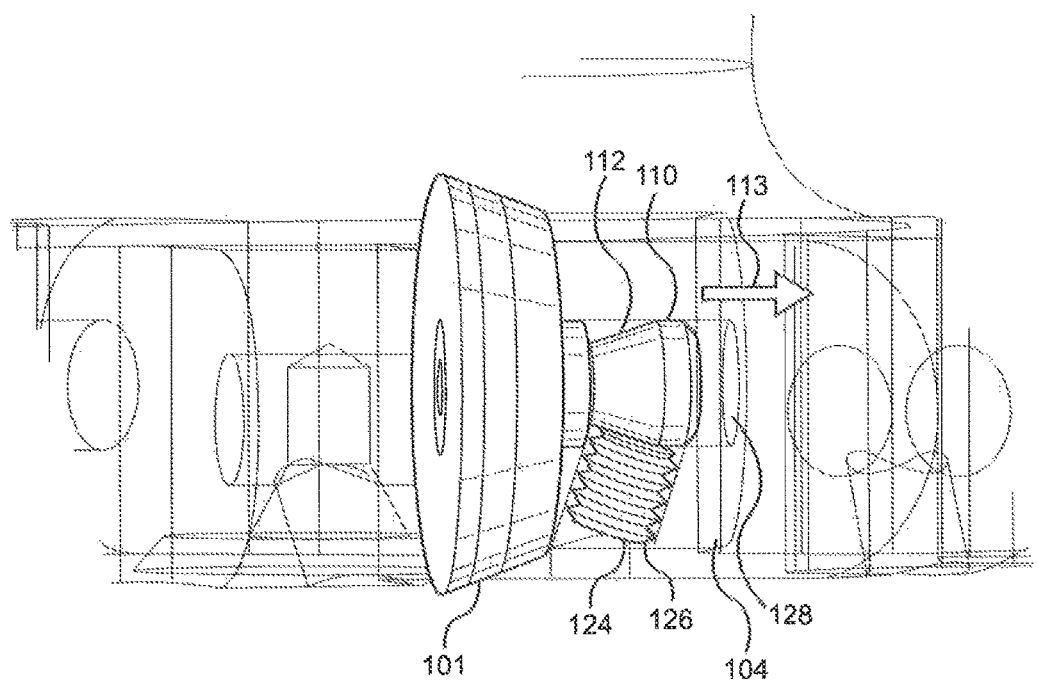
FIG. 6b is a top view of a cutting disk inserted into a flute and clamped in place with a clamping screw. The flute and tool body are shown in phantom.

FIG. 6b is a top view of cutting disk 101 fully inserted into locating bore 128 of flute 104. Inserted into threaded hole 126 is clamping screw 124, which makes flush contact with clamping bevel 112. Clamping bevel 112 is beveled such that a force in direction 113 is created when clamping screw 124 is tightened against clamping bevel 112. This clamping force works to hold cutting disk 101 in position during use due to the centrifugal forces created during rotation of milling tool 100.

Figure 7A:
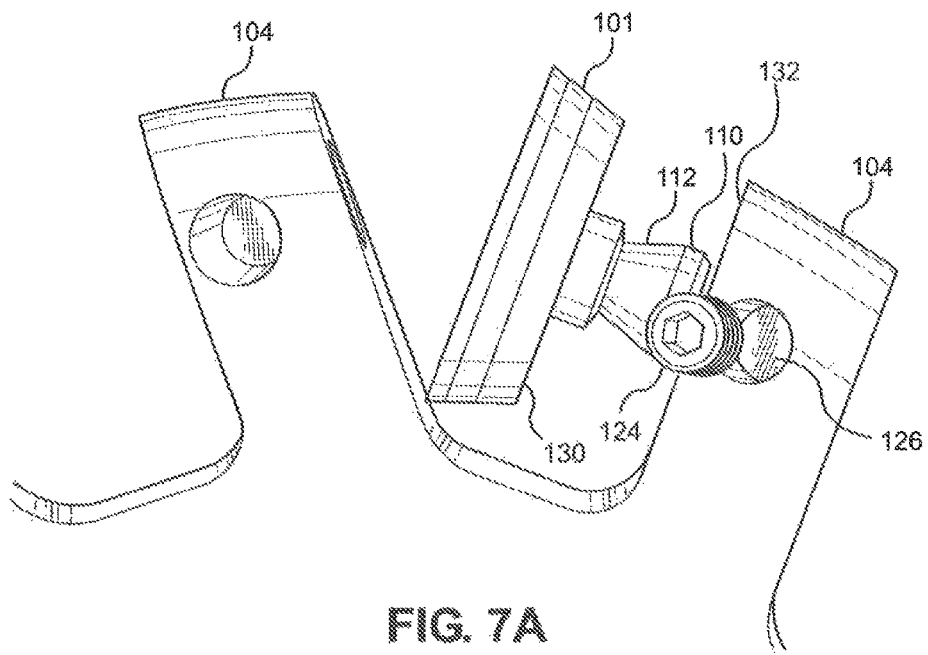
FIG. 7a is a side view of a cutting disk and clamping screw aligned for insertion into a flute.

FIG. 7a is a side view of cutting disk 101 and clamping screw 124 aligned for insertion into flute 104 through locating bore 128 (not shown) and threaded hole 126 respectively. Also shown is adequate spacing between flutes 104 allowing for cutting disk 101 to be easily inserted and removed from flute 104 without interference from an adjacent flute 104.

Figure 7B:
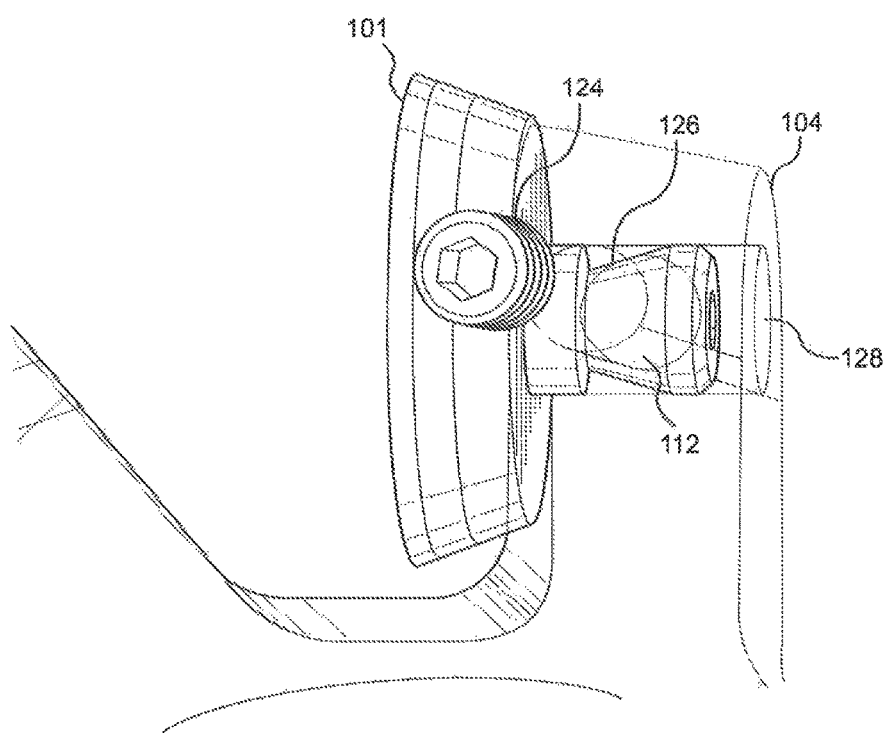
FIG. 7b is a side view of a cutting disk and clamping screw inserted into a flute. The locating bore and threaded hole are shown in phantom.

FIG. 7b is a side view of cutting disk 101 fully inserted into flute 104. Locating bore 128 is shown in phantom to demonstrate the relationship between clamping bevel 112, clamping screw 124, and threaded hole 126. Clamping pin 110 is sized such that the diameter of clamping pin 110 matches the diameter of locating bore 128. This prevents any lateral motion of cutting disk 101 relative to flute seating surface 132 during use.

Figure 8:
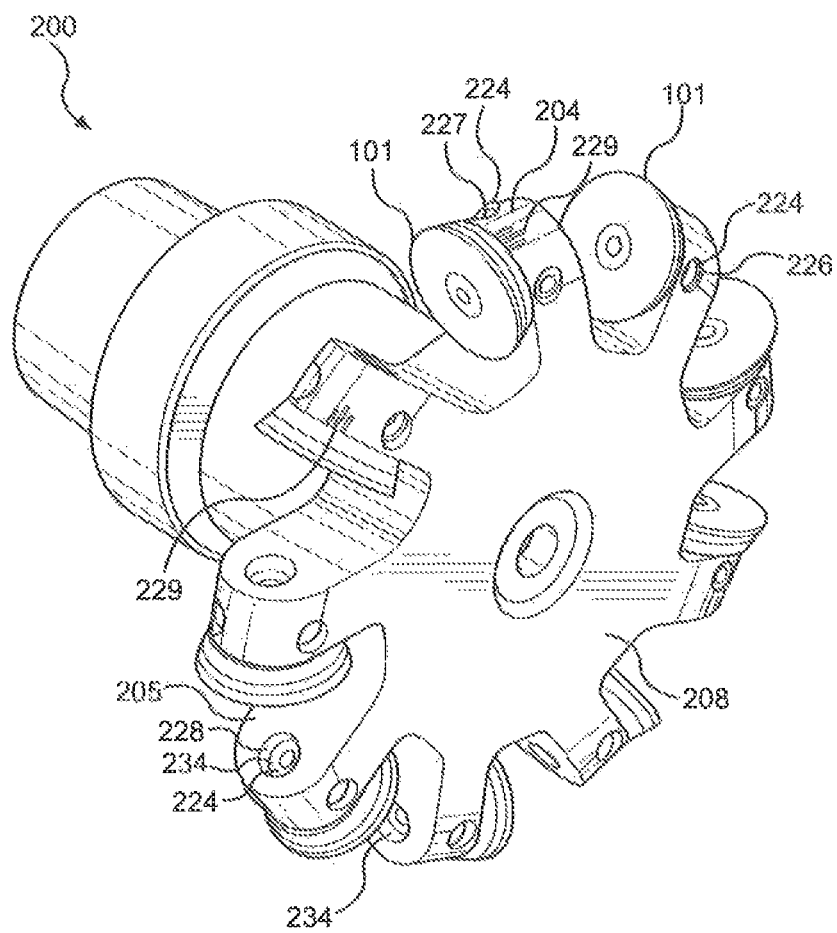
FIG. 8 is a perspective view of an alternative embodiment of the present invention showing a milling wheel having nine (9) flutes and cutting disks with each cutting disk clamped in place with a screw clamp inserted in top and side threaded holes as well as the threaded bore.

FIG. 8 is a perspective view of an alternative embodiment of the milling tool of the present invention and designated 200. Similar to the preferred embodiment shown in FIG. 4, milling tool 200 has nine (9) flutes 204 located around the outside circumference of tool body 208. Each flute 204 consists of a locating bore 228, a side threaded hole 226, a top threaded hole 227, and a threaded bore 234. Threaded bore 234 has a smaller diameter that locating bore 228. Cutting disk 101 is inserted into locating bore 228 and held in place using clamping screws 224 inserted into side threaded hole 226 and top threaded hole 227. Another clamping screw 224 is inserted into threaded bore 234 from trailing face 205, which can used to facilitate removal of cutting disk 101 from flute 204.

Also shown in FIG. 8 are position markers 229, which are used to index the rotation of cutting disk 101 during use by aligning different position indexes 127 to position marker 229. In an exemplary operation, similar to the operation described in relation to FIGS. 5 and 6a, new cutting disks 101 are installed into flutes 204. Cutting disks 101 are then all rotated such that that same position index 127 is aligned with position marker 229 on all flutes 204. Each cutting disk is clamped in place using clamping screws 224 in side and top threaded holes 226 and 227 and optionally in threaded bore 234. When it is time to rotate cutting disk 101, clamping screws are rotated out to allow free rotational movement of cutting disk 101. If cutting disk 101 becomes stuck in locating bore 228, clamping screw 224 in threaded bore 234 can be rotated in thereby pushing on clamping pin 110 to overcome any friction and ejecting the cutting disk from the locating bore 228 and freeing cutting disk 101. Each cutting disk 101 is then rotated such that a new position index 127 on each cutting disk 101 is aligned with position marker 229 then clamped in place using clamping screws 224. This process is repeated until there are no clean and sharp positions available on cutting disk 101, which is when new cutting disks 101 are installed in tool body 208.

Figure 9A:
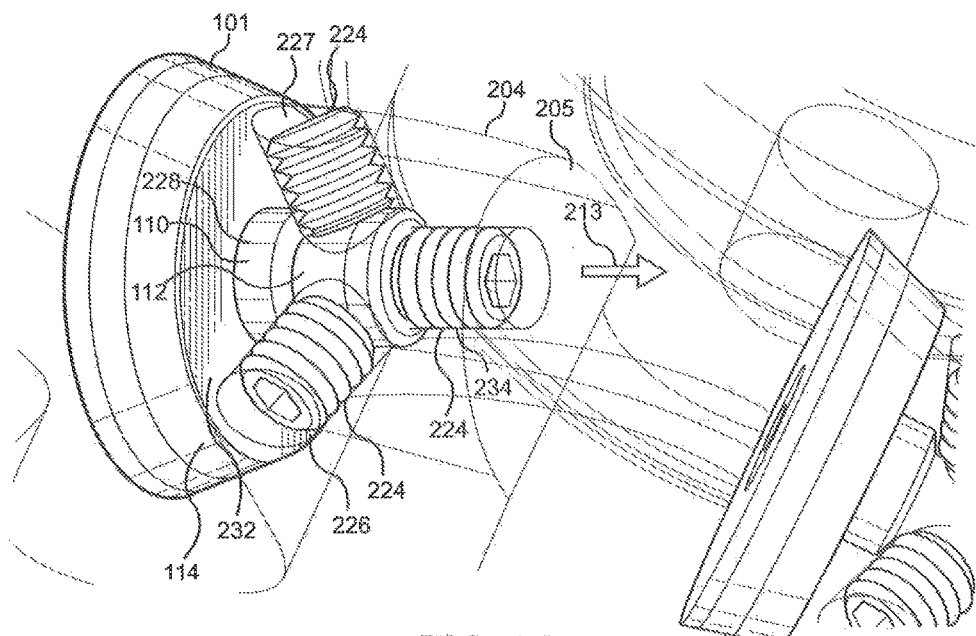
FIG. 9a is a perspective view of the alternative embodiment of the present invention in FIG. 8 showing a cutting disk clamped in place with clamping screws inserted into the top and side threaded holes as well as the threaded bore. The flute and tool body are shown in phantom.

FIG. 9a is a perspective view of the alternative embodiment of the milling tool 200 of the present invention, showing cutting disk 101 inserted into locating bore 228 of flute 204. Flute 204 is shown in phantom to show the relationship between cutting disk 101, top and side threaded holes 227 and 226, and threaded bore 234, each hole with clamping screws 224 inserted such that clamping screws make flush contact with clamping bevel 112 and clamping pin 110. Cutting disk 101 is secured in place by way of clamping screws 224 inserted into side and top threaded holes 226 and 227. When fully inserted such that clamping screws 224 are flush with clamping bevel 112, clamping screws 224 apply a force in direction 213 that maintains cutting disk base 114 flush against flute seating surface 232 such that cutting disk 101 does not move or rotate from its intended position during milling operations.

Threaded bore 234 is formed by threading the portion of the locating bore 228 closest to trailing face 205. Clamping screw 224 is then inserted into threaded bore 234. When cutting disk 101 is inserted into locating bore 228 and secured in place using clamping screws in side and top threaded holes 226 and 227, clamping screw 224 in threaded bore 234 is threaded in until clamping screw 224 makes contact with clamping pin 110 thereby applying a force in the direction opposite direction 213. Although the use of clamping screw 224 in threaded bore 234 is not necessary to adequately secure cutting disk 101 in the desired position, its use will add to the clamping force created by clamping screws 224 in side and top threaded holes 226 and 227. Another advantage of threaded bore 234 is when it is desired to remove cutting disk 101 from locating bore 228 and after clamping screws 224 in side and top threaded holes 226 and 227 have been removed, clamping screw 224 in threaded bore 234 can be rotated such that clamping screw 224 moves in the direction opposite direction 213 thereby pushing on clamping pin 110 and forcing cutting disk 101 away from flute 204. Due to the sharp nature of the cutting disks 101, if cutting disk 101 becomes stuck in flute 204, manually attempting to remove cutting disk 101 may result in personnel injury and damage to flute 204. The use of a mechanism to assist with removal of cutting disk 101 from flute 204 will reduce production costs and delays.

Figure 9B:
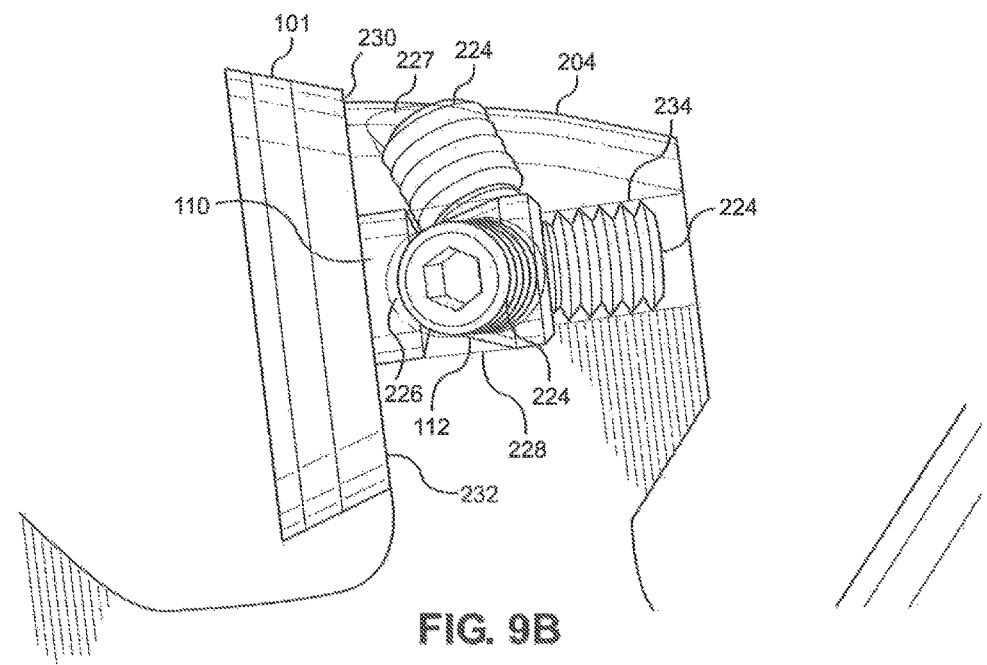
FIG. 9b is a side view of the alternative embodiment of the present invention in FIG. 8 showing a cutting disk clamped into a flute with clamping screws inserted into the top and side threaded holes as well as the threaded bore. The locating bore, threaded bore, and top and side threaded holes are shown in phantom.

FIG. 9b is a side view of the alternative embodiment presented in FIG. 9a. FIG. 9b shows cutting disk 101 fully inserted into flute 204 and secured in place with clamping screws in side and top threaded holes 226 and 227 and threaded bore 234. It can be seen from FIG. 9b that once clamping screws 224 are removed from side and top threaded holes 226 and 227, clamping screw 224 in threaded bore 234 may be used to push cutting disk 101 away from flute seating surface 232.

While the particular Milling Tool with rotatable disks as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

We claim:

1. A milling tool comprising:
   a circular tool body having an outer edge, a thickness, and a front face that defines a front plane;
   a plurality of flutes extending outward from the outer edge having a leading face and a trailing face, wherein the leading face and trailing face define a direction of rotation;
   a locating bore located in the approximate center of the lead face of each flute and extending through the flute to the trailing face;
   a threaded hole located on each flute extending into a midsection of the locating bore;
   a cutting disk having a cutting edge and a clamping pin configured to be inserted into the locating bore from the front face of a flute; and
   a screw inserted into the threaded hole and configured to engage a portion of the clamping pin.

2. The milling tool of claim 1, wherein the clamping pin extends from the back of the cutting disk, the clamping pin having a clamping bevel formed at an angle to the direction of the clamping pin such that the screw inserted into the threaded hole receives an force directed toward the locating bore during rotation of the milling wheel.

3. The milling tool of claim 1, wherein the tool body is covered with an anti-corrosion coating.

4. The milling tool of claim 3, wherein the anti-corrosion coating comprises titanium nitride.

5. The milling tool of claim 4, wherein the anti-corrosion coating further comprises aluminum.

6. The milling tool of claim 3, wherein the anti-corrosion coating is applied using chemical vapor deposition, physical vapor deposition, or nano coating.

7. The milling tool of claim 1, wherein the cutting disk further comprises a cutting disk base having a cutting disk base alignment pin extending from the center of the cutting disk base configured to receive a cutting edge backing disk having the cutting edge disposed thereon.

8. The milling tool of claim 7, wherein the cutting edge backing disk is brazed onto the cutting disk base.

9. The milling tool of claim 7, wherein the cutting edge backing disk is adhered to the cutting disk base using adhesive.

10. The milling tool of claim 1, wherein the cutting disk is configured to be rotated such that a unique portion of the cutting edge is positioned for use.

11. The milling tool of claim 1, wherein the milling tool is made from high strength composite materials having corrosion resistance properties suitable to withstand the effects of chemicals and agents used in the milling process.

12. The milling tool of claim 1, wherein the cutting edge is made from a poly crystalline diamond.

13. The milling tool of claim 1, wherein position markers are located on the cutting disk to identify used and unused portions of the cutting edge.

14. The milling tool of claim 1, wherein the locating bore comprises a threaded portion configured to receive a clamping screw.

15. The milling tool of claim 1, wherein each flute further comprises a second threaded hole extending into the midsection of the locating bore.

16. The milling tool of claim 1, wherein the cutting disk is manufactured from a single piece of high strength material.

17. The milling tool of claim 1, wherein the cutting disk consists of a single base piece having a clamping pin with the cutting edge applied thereto.

18. The milling tool of claim 17, wherein the cutting edge is applied to the single base piece using chemical vapor deposition, physical vapor deposition, or nano coating.

\* \* \* \* \*